(12) United States Patent
Lange

(10) Patent No.: US 10,422,424 B2
(45) Date of Patent: Sep. 24, 2019

(54) CONTROL ELEMENT, IN PARTICULAR FOR A MOTOR VEHICLE

(71) Applicant: Marquardt GmbH, Rietheim-Weilheim (DE)

(72) Inventor: Thomas Lange, Donaueschingen (DE)

(73) Assignee: Marquardt GmbH, Rietheim-Weilheim (DE)

( * ) Notice: Subject to any disclaimer, the term of this patent is extended or adjusted under 35 U.S.C. 154(b) by 714 days.

(21) Appl. No.: 14/930,942

(22) Filed: Nov. 3, 2015

(65) Prior Publication Data
US 2016/0123459 A1    May 5, 2016

(30) Foreign Application Priority Data
Nov. 5, 2014  (DE) ................ 10 2014 016 291

(51) Int. Cl.
*F16H 59/02*   (2006.01)
*H02K 5/24*    (2006.01)
*F16H 61/24*   (2006.01)

(52) U.S. Cl.
CPC ... *F16H 59/0208* (2013.01); *F16H 2061/241* (2013.01); *H02K 5/24* (2013.01)

(58) Field of Classification Search
CPC .. F16H 59/0208; F16H 2061/241; H02K 5/24
USPC .............. 74/473.3, 473.33; 310/51
See application file for complete search history.

(56) References Cited

U.S. PATENT DOCUMENTS

| 3,143,284 | A | * | 8/1964 | Lindsjo | F04D 29/646 248/606 |
| 3,256,828 | A | * | 6/1966 | Rule | F04D 13/083 310/51 |
| 3,527,969 | A | * | 9/1970 | Hermann | H02K 5/24 310/43 |
| 5,397,950 | A | * | 3/1995 | Norbury, Jr. | H02K 1/187 310/51 |
| 8,316,734 | B2 | | 11/2012 | Giefer et al. | |
| 8,410,646 | B2 | * | 4/2013 | Mori | H02K 5/24 248/632 |

(Continued)

FOREIGN PATENT DOCUMENTS

DE    10 2005 030 218 A1    1/2007
DE    10 2007 058 850 A1    6/2009

(Continued)

OTHER PUBLICATIONS

German Search Report (Application No. 10 2014 016 291.5) dated Aug. 5, 2015.

*Primary Examiner* — William C Joyce
(74) *Attorney, Agent, or Firm* — Burr & Brown, PLLC

(57) ABSTRACT

A control element, in particular a shifting device for manually selecting and/or triggering functions in a motor vehicle, having a handle that is mounted in such a way on and/or in a housing that the handle can be moved manually. A drive is situated in the housing, such that the drive is in operative connection and/or can be brought into operative connection with the handle, and the handle can be positioned non-manually by the drive and/or the manual movement of the handle can be blocked and/or the manual movement of the handle can be enabled. An elastic element is provided on the drive and/or in the housing, such that the drive is decoupled acoustically from the housing.

10 Claims, 6 Drawing Sheets

(56) References Cited

U.S. PATENT DOCUMENTS

| | | | |
|---|---|---|---|
| 8,841,802 B2* | 9/2014 | Kouzu | H02K 5/24 |
| | | | 310/51 |
| 9,541,156 B2* | 1/2017 | Blumenthal | B60N 2/0232 |
| 2004/0032177 A1* | 2/2004 | Nitzsche | H02K 5/24 |
| | | | 310/91 |
| 2008/0179117 A1 | 7/2008 | Scheer | |
| 2010/0300234 A1* | 12/2010 | Giefer | F16H 59/10 |
| | | | 74/473.25 |
| 2014/0033849 A1* | 2/2014 | Yamamoto | F16H 59/0217 |
| | | | 74/473.12 |

FOREIGN PATENT DOCUMENTS

| | | |
|---|---|---|
| DE | 10 2008 042 105 A1 | 3/2010 |
| DE | 10 2013 102 834 A1 | 9/2014 |
| WO | WO 2013/000454 * | 1/2013 |

\* cited by examiner

CONTROL ELEMENT, IN PARTICULAR FOR A MOTOR VEHICLE

FIELD OF THE INVENTION

The invention relates to a control element.

BACKGROUND OF THE INVENTION

Control elements, such as electric and/or electronic switching devices designed in the manner of a joystick and/or of a cursor switch, are used for manually selecting and/or triggering functions in a motor vehicle. Inter alia, such shifting devices are used by a user to input data for an electrical appliance, e.g. in the case of car radios, navigation devices, on-board computers or similar appliances in motor vehicles. In particular, a control element of this kind can also be used as an electronic gear selector switch for a shift-by-wire transmission in motor vehicles.

A control element of this kind has a handle, which can be designed in the manner of a selector lever, for example. The handle is mounted on and/or in a housing in such a way that the handle can be moved manually. There is a drive in the housing. In turn, the drive is in operative connection and/or can be brought into operative connection with the handle, such that the handle can be positioned non-manually by means of the drive and/or the manual movement of the handle can be blocked and/or the manual movement of the handle can be enabled. It has been found that certain noises associated with movement and/or shifting can occur at and/or in the control element.

It is the underlying object of the invention to develop the control element in such a way that such noise is reduced. In particular, the acoustics, measured in decibels for example, are minimized during the shifting processes of the control element and/or the shifting noise for the control element is improved in quality.

SUMMARY OF THE INVENTION

In the case of the control element according to the present invention, an elastic element is provided on the drive and/or on the housing and/or in the housing. As a result, the drive is decoupled acoustically from the housing. Noise associated with movement and/or shifting at the control element is thus advantageously reduced.

The drive can expediently be an electric motor and/or an electromagnet. In the customary manner, the drive can have a motor housing. A simple solution may then be for the elastic element to be configured in the manner of an adapter for the motor housing. For the sake of simplicity, it may be appropriate for the elastic element to be secured on the housing.

In order to allow simple installation of the drive in the housing, the elastic element can have a receptacle for fastening the drive in the housing. To extend functionality, the elastic element can simultaneously serve as a centering means and/or anti-rotation lock for the arrangement of the drive in the housing. This centering means and/or anti-rotation lock can be accomplished in a simple manner by means of the receptacle.

In a low-cost and functionally reliable embodiment, the elastic element can have a rubber coating, an elastic coating or the like. To increase functionality, the elastic element can have a stop, which can, in particular, be rubber-coated and/or of elastic configuration, such that the end position of the drive in the housing and/or on a housing part, for example the housing side part, is fixed. In particular, simple installation of the drive in the housing is thereby obtained.

In a manner favorable for installation, the elastic element can be configured in the manner of a shell. Embodiment by means of two half shells is particularly expedient here. As a result, the elastic element at least partially surrounds the motor housing, thereby achieving the acoustic decoupling of the drive from the housing in a simple manner.

The control element according to the present invention is suitable particularly for use in a shift-by-wire shifting device for a transmission in motor vehicles, i.e., in an electronic gear selector switch on a motor vehicle. In this case, the handle is the selector lever for the shift-by-wire shifting device. The shift-by-wire shifting device produces signals corresponding to the position of the handle, which is moved manually by the user. These signals then serve, in turn, for corresponding control of the transmission. The selector lever of the gear selector switch can be provided with extended functionalities for operation by the user. More specifically, it is possible, in particular, for the selector lever to be locked and/or released for manual movement by the user. In particular, the selector lever can furthermore be designed for automatic return.

The following may be noted in respect of a particularly preferred embodiment of the invention.

For a gear selector switch, the acoustics during the shifting processes should be minimized as regards the maximum decibel figure dBA and/or the shifting noise should be configured so as to be of higher quality. To solve these problems, rubber coating of the motor for noise reduction is provided. For this purpose, the motor is decoupled acoustically from the housing using rubber coating by means of an adapter. The adapter can simultaneously be used as a centering means and/or anti-rotation lock. The end position of the motor in the housing can be implemented by means of a rubber-coated stop on the housing side part.

The advantages obtained by means of the present invention consist especially in that the solution according to the present invention offers a reduction in the maximum value of the sound pressure level dBA for the noise which occurs. Moreover, the remaining shifting noise appears to be of higher quality and/or is experienced by the user of the control element as being of higher quality.

BRIEF DESCRIPTION OF THE DRAWINGS

An illustrative embodiment of the invention with various developments and configurations are shown in the drawings and described below in greater detail. In the drawings.

DETAILED DESCRIPTION OF THE INVENTION

Figure 1:
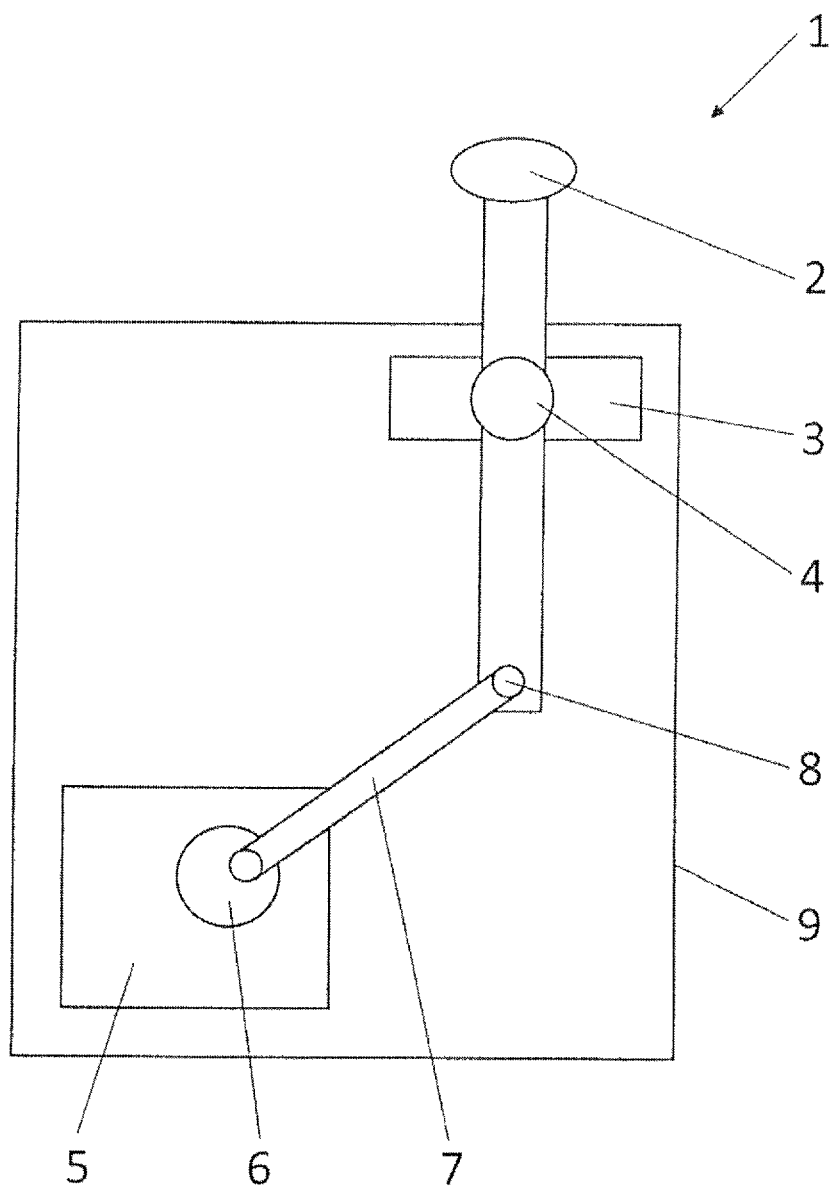
FIG. 1 shows a control element in a schematic illustration.

FIG. 1 shows a control element 1 having a housing 9, wherein the control element 1 is used for manual selection and/or triggering of functions in a motor vehicle. In particular, the control element 1 is used as a gear selector switch for a shift-by-wire shifting device in motor vehicles. The control element 1 is provided with a movable handle 2 in the form of a selector lever, which projects from the housing 9. The handle 2 is mounted movably on and/or in the housing 9, more specifically by means of a bearing 4 on a support 3 situated in the housing 9. As a result, the handle 2 can be moved manually by the user, thereby triggering the respectively desired functions in motor vehicles. In the case of a gear selector switch, for example, the desired drive ratios for the transmission can thereby be selected by the user.

In FIG. 1, the bearing 4 is indicated only schematically. It can also be configured in the manner of a Cardan-type bearing, for example, allowing the handle 2 to be moved in various directions by the user. Versatile manual operation of the control element 1 can thereby be made possible.

The control element 1 has a drive 5 situated in the housing 9. The drive 5 is in operative connection with the handle 2 by means of a crankshaft 6 and of a link rod 7 or connecting rod 7 and/or can thereby be brought into operative connection with the handle 2. By means of the drive 5, which can be controlled in an appropriate manner by a control unit for example, the handle 2 can then be positioned non-manually, and/or the manual movement of the handle 2 can be locked and/or the manual movement of the handle 2 can be enabled. For this purpose, the link rod 7 or connecting rod 7 is in operative connection by nonpositive and/or positive engagement with the handle 2 and/or can be brought into operative connection with the handle 2 for this purpose.

According to the embodiment shown by way of example in FIG. 1, the connecting rod 7 is in operative connection with the handle 2 by means of a joint 8 and/or can be brought into operative connection with the handle 2 by means of the joint 8. The drive 5 then moves the crankshaft 6. The connecting rod 7 is, in turn, moved by the crankshaft 6. The operative connection between the drive 5 and the handle 2 is finally effected by means of the connecting rod 7 via the joint 8. Instead of the crankshaft 6 and the connecting rod 7, it is also possible to use a camshaft or the like to achieve the operative connection.

As can be seen from FIG. 2, FIG. 4, FIG. 5 and FIG. 6, the drive 5 comprises an electric motor. Via a transmission, the electric motor 5 moves the crankshaft 6. More specifically, in the present case this involves a worm gear, which comprises a worm 10, which is arranged on the output shaft of the electric motor 5, and a gearwheel 11, which is situated on the crankshaft 6 and meshes with the worm 10. By virtue of the compact construction of such a drive 5 together with the operative connection means, this drive can also be accommodated in a confined installation space for the control element 1. Instead of an electric motor, it is also possible to use an electromagnet or the like as a drive 5, although this is not shown specifically.

Figure 2:
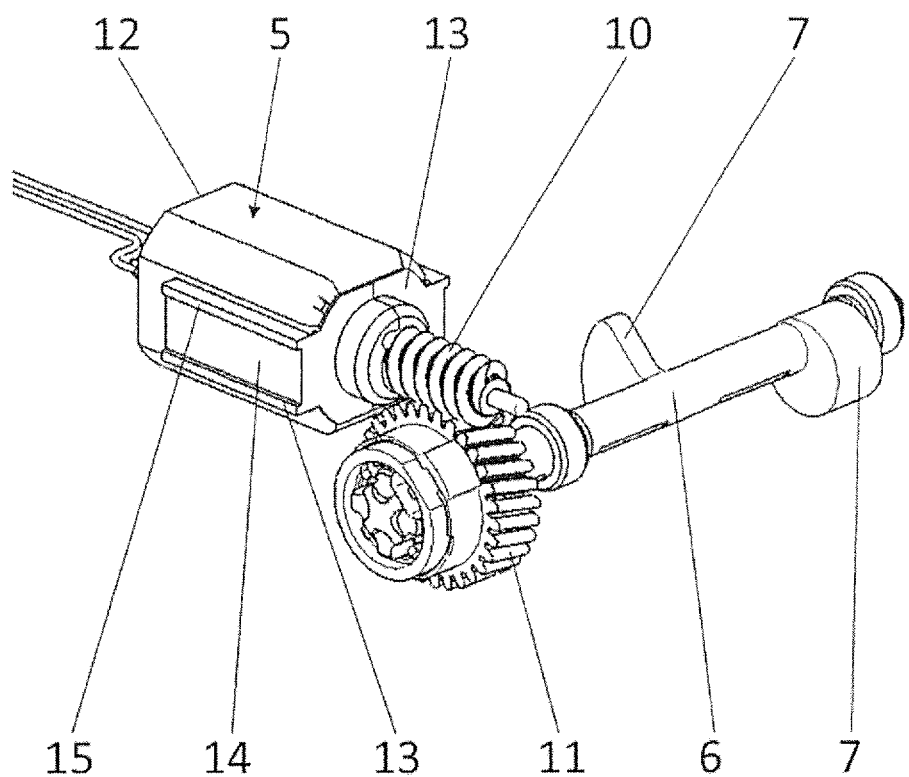
FIG. 2 shows the drive of the control element with a crankshaft and a connecting rod in perspective view.

The electric motor 5 used as a drive has a motor housing 12, as can be seen from FIG. 2. An elastic element 13 is provided on the drive 5, between the motor housing 12 and the housing 9, such that the drive 5 is acoustically decoupled from the housing 9. By virtue of this decoupling, drive noise from the drive 5 is correspondingly attenuated and, at most, is transmitted in attenuated form to the housing 9. As a result, a reduction in this noise for the user is achieved. Of course, the elastic element 13 can also be arranged on and/or in the housing 9, instead of on the motor housing 12.

Figure 3:
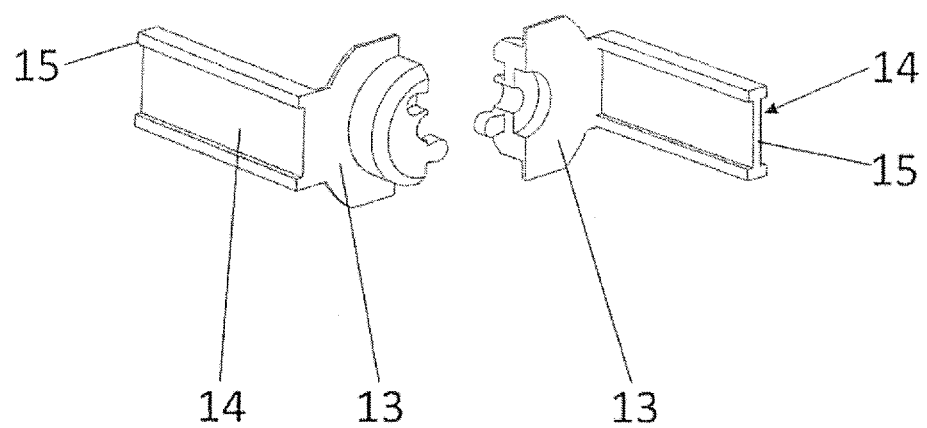
FIG. 3 shows the elastic element as a single component in front view and in rear view.
Figure 4:
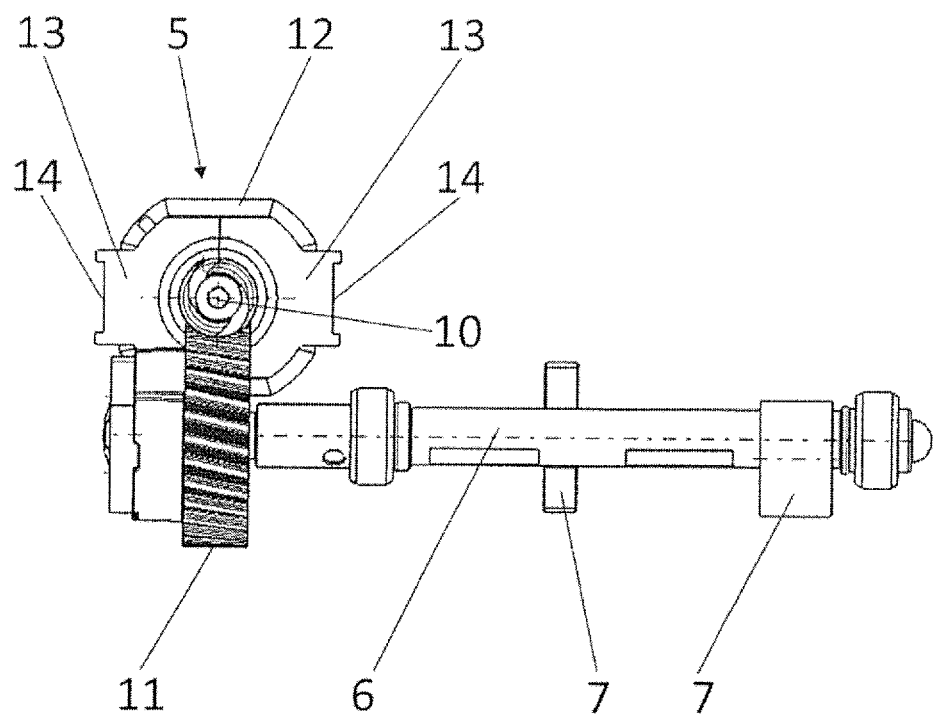
FIG. 4 shows the drive with the crankshaft and the connecting rod in front view.

The elastic element 13 is secured on the motor housing 12. As can furthermore be seen in FIG. 3, the elastic element 13 is configured in the manner of an adapter for the motor housing 12, and, as a result, can be mounted in an appropriate manner on the motor housing 12 in order to secure the housing. For this purpose, according to FIG. 3, the elastic element 13 can expediently be configured in the manner of a shell. More specifically, as can be seen in FIG. 2, use is made of two interlocking half shells, such that the elastic element 13 at least partially surrounds the motor housing 12.

The elastic element 13 can be composed entirely of an elastic material, e.g. rubber. However, the elastic element 13 can also be composed of a rigid material and have a rubber coating, an elastic coating or the like. For example, the elastic element 13 can be composed of metal, of plastic or the like, wherein a rubber coating or some other elastic layer is applied to the surface thereof. The elastic element 13 can also be produced using a thermoplastic elastomer. The elastic element 13 can be produced at low cost by means of injection molding, including, for example, two-component injection molding from a thermoplastic or an elastomeric plastic.

Figure 5:
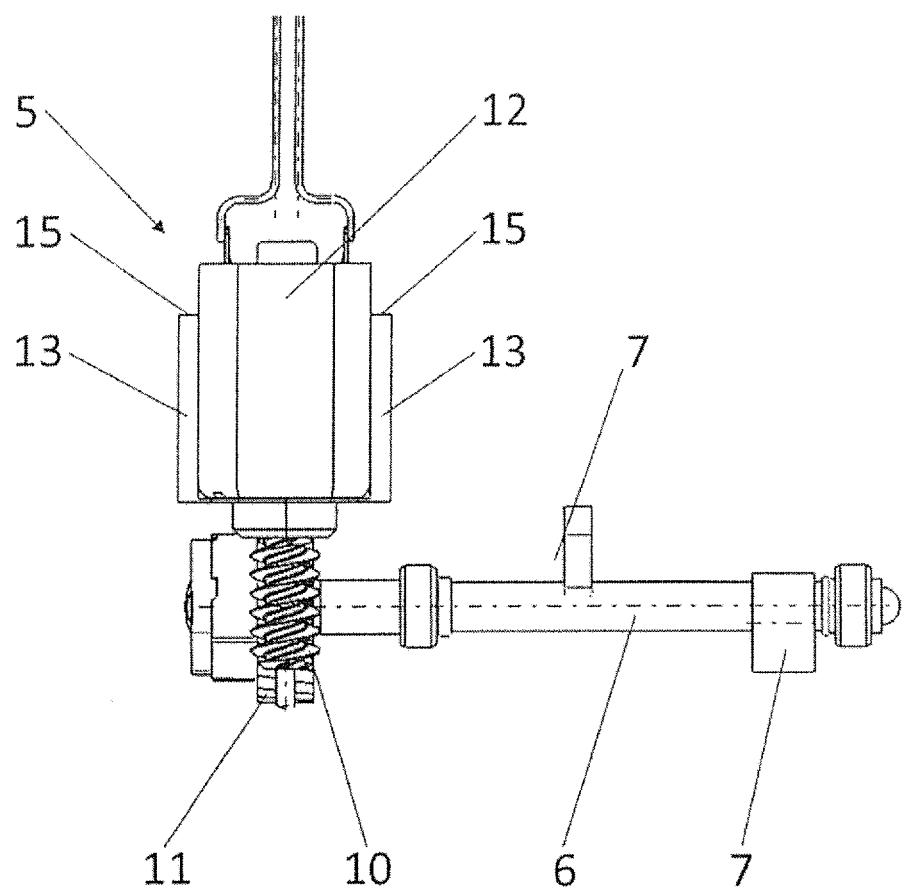
FIG. 5 shows the drive with the crankshaft and the connecting rod in plan view.
Figure 6:
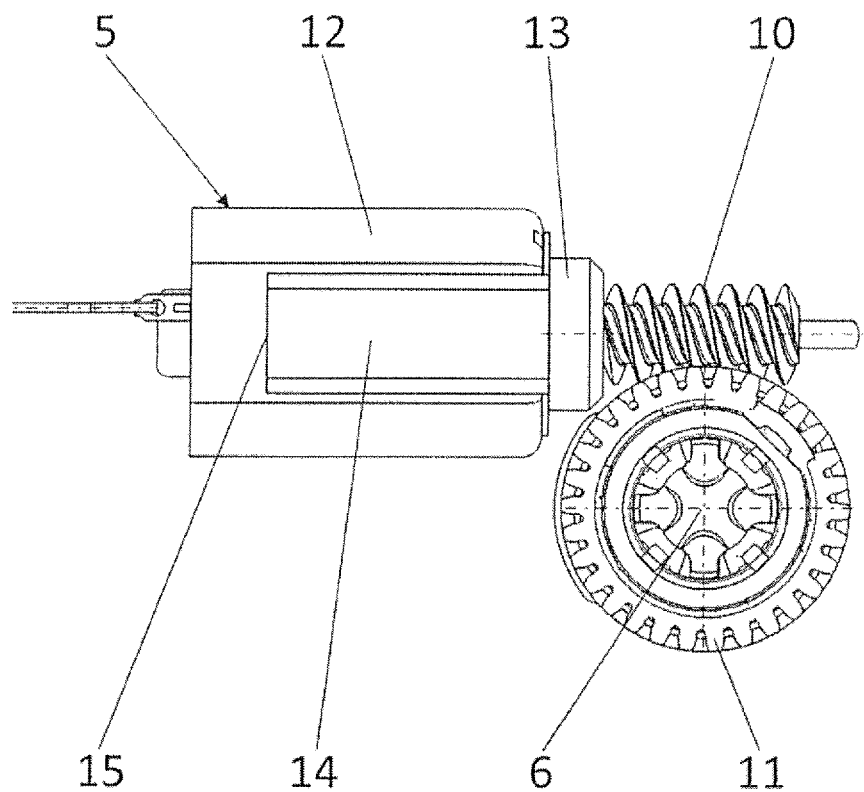
FIG. 6 shows the drive with the crankshaft and the connecting rod in side view.

According to FIG. 2, the elastic element 13 has a receptacle 14 for securing in and/or on the housing 9. As a result, the adapter 13 also serves as a centering means and/or an anti-rotation lock for the arrangement of the drive 5 in the housing 9, which is effected, in particular, by means of the receptacle 14. Finally, the adapter 13 can have a stop 15, e.g. a rubber-coated and/or elastic stop, as can be seen in FIG. 5 or FIG. 6. During the installation of the drive 5, the end position of the drive 5 in the housing 9 or on a housing part of the housing 9, e.g. on a housing side part, is thereby fixed.

A control element 1 of this kind can be used for a gear selector switch in motor vehicles. In a shift-by-wire shifting device of this kind for the transmission in motor vehicles, the handle 2 is the selector lever for the shift-by-wire shifting device, and the shift-by-wire shifting device produces signals corresponding to the position of the handle 2, wherein the signals are used to control the transmission. However, the present invention is not restricted to the illustrative embodiment described and shown. On the contrary, it also includes all developments by a person skilled in the art within the scope of the invention defined by the patent claims. Apart from motor vehicle applications, a control element 1 of this kind can also advantageously be used as an input means for computers, machine tools, household appliances or the like.

LIST OF REFERENCE SIGNS

1: control element
2: handle/selector lever
3: support
4: bearing
5: drive/electric motor
6: crankshaft
7: link rod/connecting rod
8: joint
9: housing
10: worm
11: gearwheel
12: motor housing
13: elastic element/adapter
14: receptacle (in adapter)
15: stop (on adapter)

The invention claimed is:

1. A control element for a motor vehicle, comprising (i) a handle, mounted in such a way on and/or in a housing that the handle can be moved manually, (ii) a drive situated in the housing, wherein the drive, which has an axial extending direction, is in operative connection and/or can be brought into operative connection with the handle, such that the handle can be positioned non-manually by the drive and/or the manual movement of the handle can be blocked and/or the manual movement of the handle can be enabled, and (iii) an elastic element provided on the drive and/or on the housing and/or in the housing, such that the drive is decoupled acoustically from the housing, wherein the elastic element comprises two interlocking half shells, which comprise side surfaces that extend in an axial direction and radially extending surfaces that extend in a direction perpendicular to the axial direction of the side surfaces, with outermost edges of the radially extending surfaces configured to face each other in an opposed interlocking manner, and wherein the two interlocking half shells are arranged on the drive so as to have the side surfaces extend in the axial extending direction of the drive and the outermost edges of the radially extending surfaces are interlocked therebetween in the direction perpendicular to the axial direction of the side surfaces, such that the elastic element at least partially surrounds the drive.

2. The control element according to claim 1, wherein the drive is an electric motor and/or an electromagnet, wherein the drive has a motor housing, and wherein the elastic element is configured in the manner of an adapter for the motor housing.

3. The control element according to claim 2, wherein the elastic element is secured on the motor housing.

4. The control element according to claim 1, wherein the elastic element has a receptacle for fastening the drive in the housing.

5. The control element according to claim 4, wherein the receptacle of the elastic element serves as a centering mechanism and/or anti-rotation lock for the arrangement of the drive in the housing.

6. The control element according to claim 1, wherein the elastic element has a rubber coating or an elastic coating.

7. The control element according to claim 1, wherein the elastic element has a stop, such that the end position of the drive in the housing and/or on a housing part of the housing is fixed during installation of the drive.

8. The control element according to claim 7, wherein the stop is rubber-coated or elastic.

9. A shift-by-wire shifting device for a transmission in motor vehicles, having a control element according to claim 1, wherein the handle is a selector lever for the shift-by-wire shifting device, wherein the shift-by-wire shifting device produces signals corresponding to the position of the handle, and wherein the signals are used to control the transmission.

10. The control element according to claim 1, wherein the control element is a shifting device for manually selecting and/or triggering functions in the motor vehicle.

* * * * *